Jan. 19, 1932.   W. A. PETERS   1,841,847
FINGER NAIL CLIP
Filed July 6, 1931   2 Sheets-Sheet 1
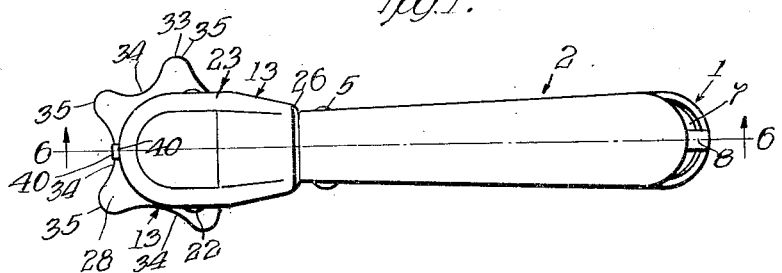
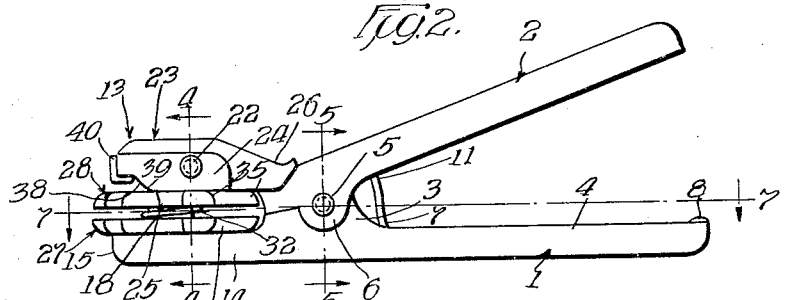

Jan. 19, 1932. W. A. PETERS 1,841,847
FINGER NAIL CLIP
Filed July 6, 1931  2 Sheets-Sheet 2
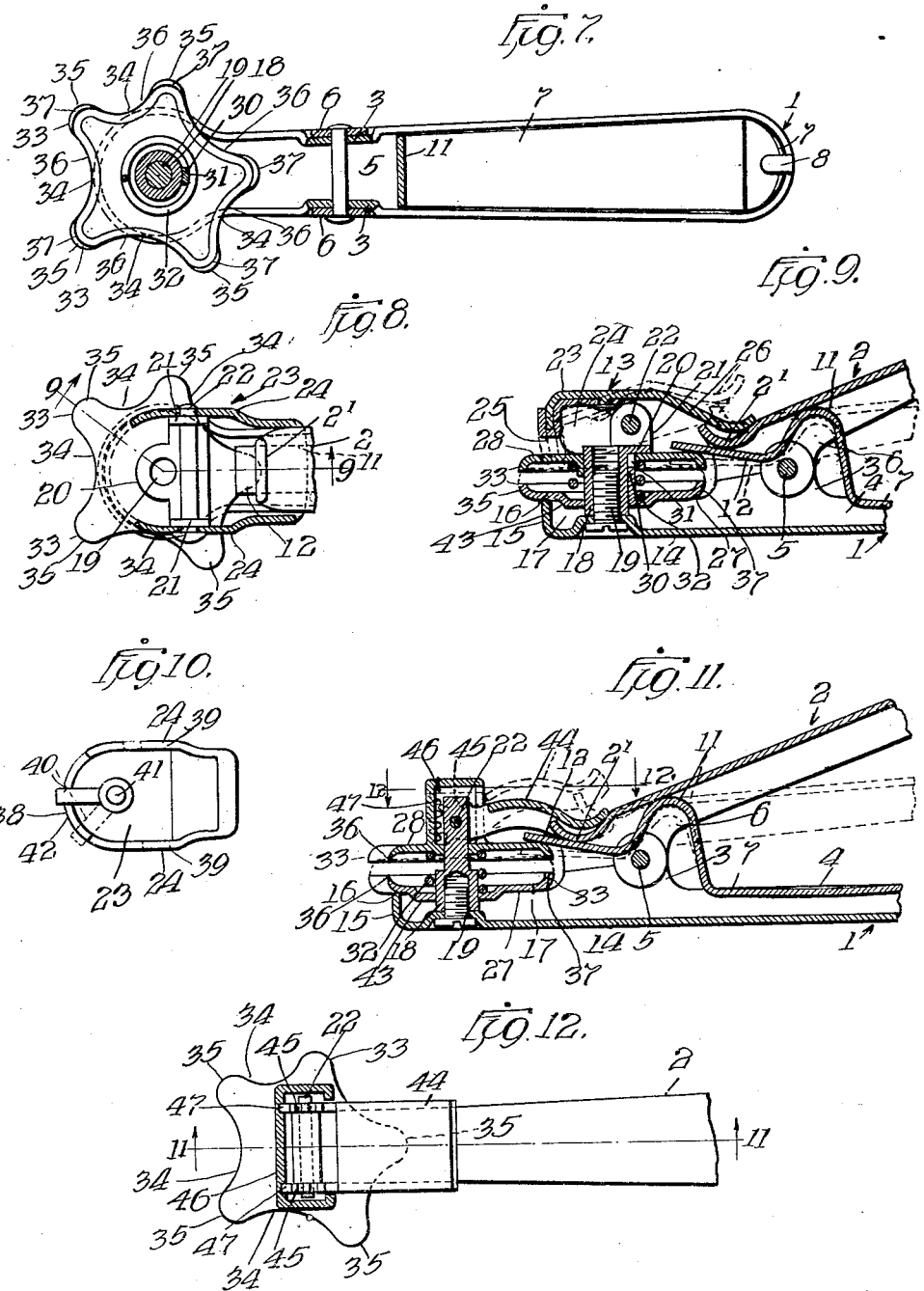

Patented Jan. 19, 1932

1,841,847

UNITED STATES PATENT OFFICE

WILLIAM A. PETERS, OF CHICAGO, ILLINOIS, ASSIGNOR OF ONE-HALF TO DAVID JAMES, OF CHICAGO, ILLINOIS

FINGER NAIL CLIP

Application filed July 6, 1931. Serial No. 548,936.

This invention relates to improvements in devices for trimming or clipping the finger nails, such devices commonly being called nail clippers.

The object of the invention is to provide a device for this use which can be conveniently used by a person on his own finger nails or upon the finger nails of others; which shall have a plurality of shapes or sizes of cutters readily arrangeable for use; which shall have a plurality of cutters of different sizes or shapes in positions for use at all times; which shall be capable of being arranged to especially apply heavy cutting pressure to specific pairs of cutters as desired; which shall have cutting edges which are protected against being dulled by contact with each other; which shall be so arranged that very powerful cutting pressure can easily be applied for use; and which shall be light in weight and of pleasing design.

Other features of advantage will become apparent from the following description taken in conjunction with the appended claims and the accompanying drawings forming part of this specification and in which:—

Fig. 1 is a top-plan view of a device embodying the invention in one form;

Fig. 2 is a side view of the device shown in Fig. 1;

Fig. 3 is a front end view of the device;

Figs. 4 and 5 are transverse sections on the line 4—4 and 5—5, respectively, of Fig. 2;

Fig. 6 is a longitudinal, central, vertical section on the line 6—6 of Fig. 1;

Fig. 7 is a horizontal section on the line 7—7 of Fig. 2;

Fig. 8 is a fragmentary, substantially horizontal section on the line 8—8 of Fig. 8;

Fig. 9 is a fragmentary, substantially central, longitudinal, vertical section on the line 9—9 of Fig. 8;

Fig. 10 is a bottom plan view of one of the lever members particularly showing the shiftable fulcrum device;

Fig. 11 is a fragmentary, longitudinal, central, vertical section similar to Fig. 9 but illustrating a slightly modified construction; and Fig. 12 is a fragmentary, horizontal section on the line 12—12 of Fig. 11.

The device as shown in the drawings comprises a base or main handle member 1 and a co-operating lever handle member 2, both formed up out of sheet metal.

The base member 1 is provided between its ends with a pair of up-standing ears 3 rising from its side walls 4 and pierced to receive a connecting pivot pin 5, the forward end of the handle member 2 being provided with depending ears 6 which are likewise pierced to receive the pivot pin 5 and the two members 1 and 2 are thus pivotally mounted in the relation of handles of a pair of pliers. These handle members are normally held separated, as shown in Figs. 2 and 6, by a long flat spring 7 which is arranged between the handles.

The spring 7 is held in place between the handles by the engagement of a bendable tongue 8 at the free rear end of the handle member 1, the rear end 9 of the spring being formed into a hook, as shown, for engagement beneath the tongue 8. The lower part 10 of the hook 9 forms a fulcrum upon which the spring is supported for its resilient action.

The opposite end portion of the spring is bent upwardly to form a shoulder 11 for contact with the lower side of the handle member 2 just to the rear of the pivot 5 and operates to normally hold the handles separated, as shown.

The free end 12 of the spring 7 extends forwardly into the head part 13 of the device and has a function which will be described later.

The head part 13 of the device comprises a forward extension 14 of base handle member 1, which is somewhat cup-shaped, having a peripheral up-standing wall 15 with a flat or horizontal edge 16, and forms the lower jaw member of the device. It is to be noted that the side walls 4 of the base member 1, which make this member channel shaped in cross-section extend forward and merge into wall 15 of the extension or lower jaw 14. This construction is very strong and light and the metal is in the best form to prevent any distortion of the member by the force applied to the cutters. This lower part 14 carries a fixed central guide member 17.

As shown, the guide member comprises a tubular part 18 which is internally screw-threaded to receive a fastening screw 19 entering through the bottom of the member 14, and an upper head part 20 provided with two up-standing ears 21 pierced to receive a horizontal pivot pin 22. Upon the pin 22 is pivotally mounted an upper jaw member 23 which, similar to the lower jaw member, is somewhat cup-shaped, having a peripheral wall 24 pierced to receive the pivot pin 22, and has a lower edge 25 opposed to the flat upper edge 16 of the lower jaw 15.

The upper jaw member 23 being cup or cap shaped serves to enclose and cover up the working parts between the jaws, thus presenting a smoothly finished device of pleasing appearance.

This lower edge 25 of the upper jaw member is not flat like the opposed edge of the lower member but is formed and adapted to provide fulcrum points 25' for applying the cutting or operating pressure.

The pivot pin 22 is located to the rear of the center of the cutters and the fulcrum or pressure points 25' are arranged slightly in front of the center of the cutters in the best relation for applying the pressure to the cutters.

The upper member is adapted to be swung on the pivot pin 22 by the upper handle member 2, the handle member when swung down as shown in dotted lines in Fig. 6, being adapted to swing the rear end 26 of the jaw 23 upwardly and consequently its forward part downwardly towards the lower jaw member. To effect this movement the rear part 26 of the upper jaw member extends over the forward end 2' of the handle member 2, as best shown in Fig. 6, and the two are formed to provide sliding engagement to permit the necessary relative movement during operation. As the handle member 2 is swung down, the upper jaw is swung to the dotted position shown in Fig. 6, that is, its forward part is swung down toward the lower jaw member.

Between these two jaw members are arranged a pair of cutters comprising a lower cutter member 27 and an upper cutter member 28.

These cutters are flat disk-like members centrally mounted on the central, vertical guide member 18 to rotate. The upper cutter 28 is provided with a central bearing nozzle 29 for rotation and up and down movement on the guide member 18, and the lower cutter 27 is keyed to the upper cutter for rotation therewith by key projection 30 rigid with the lower cutter and projecting up alongside of the guide member 18 and passing through a notch 31 in the inner edge of the upper cutter 28.

Between the cutters 27 and 28 and surrounding the guide 18 is a coiled spring 32 which tends to keep the cutters separated and against the tension of which the cutters are forced toward each other for use in clipping nails.

The cutters have been described as being flat disk-like members but their peripheries 33 are turned toward each other and are formed into a plurality of re-entrant curves 34 of different radii, as best shown in Figs. 7 and 8, thereby forming outwardly extending projecting portions 35 between the curves 34. The inwardly curved parts of the edges of the cutters are beveled on their inner sides to form cutting edges 36. The outwardly extending projecting portions 35 between the cutting edges 36 are oppositely curved or rounded and the beveling is extended onto the ends of these parts thus extending the ends of the cutting edges in slightly reversed curves, but the middle portions of these outwardly extending parts are not completely beveled; thus providing flat shoulders or contacting surfaces 37 which effectively prevent the opposed cutting edges of the cutters bruising and dulling each other in the use of the device.

The reverse curved form of the ends of the cutting edges prevent the leaving of uncut or unsevered parts when clipping the nails. In other words, by this means the leaving of snags or partly severed pieces is prevented.

The peripheral walls of the cutters are complete and when the cutting edges are pressed together, the space within the cutters is a closed space in which the clipped off portions of the nails are held until the handle 2 is allowed to recede from its pressed down position.

This is of advantage as the clippings can be retained in the device and deposited or removed at will and prevents the scattering of the clippings where not desired.

As shown, the re-entrant curved parts of the cutters are of different sizes and, preferably, are five in number, as shown, so that one is set directly opposite to the handles or on the end of the device, the next adjacent curves will be set one on each side and in front of the pivot pin 22, the cutting edges of these two side portions being thus located about half way between the forward cutting edges and the pivot pin.

In the use of the device, either the cutting edges at the outer end of the device can be used or the cutting edges at either side.

As explained before, the upper jaw 23 is peculiarly formed at its periphery which is opposed to the periphery of the lower jaw. This peculiar formation consists in cutting away the forward part of this periphery as shown at 38 to provide rounded bearing or fulcrum points 39, one on each side substantially midway between the pivot pin 22 and the forward edge of the jaw 23. These bearing or fulcrum points bear on the upper cutter and force it with great power towards the lower cutter to accomplish the cutting action.

As the upper jaw 23 is cut away as described, it will not bear on the forward part of the upper cutter when it is desired to use the forward pair of edges. For the purpose of arranging the device so that the force can be applied directly to the forward pair of cutting edges, there is provided a movable abutment consisting of an arm 40 pivotally mounted on the underside of the upper jaw at 41, Fig. 10, and arranged to swing around the forward end 42 of the jaw member 23 and adapted to be swung to a mid-position, as shown in full lines, Fig. 10, when it is desired to use the end cutting edges and to be swung around to one side or the other, as shown in dotted lines, Fig. 10, out of the way when it is desired to use the side cutting edges.

The several cutting edges are made of different radii for use on different sizes of nails and may be made of various shapes to produce trimmed nails of different shapes as fashion may dictate.

As best shown in Fig. 7, the sides of the lower handle member next the pivot 5 are formed inwardly to receive the ears on the upper handle member and present a neat finished appearance. It should be noted that the edges of the handle members are formed inwardly toward each other, for the purpose of providing a maximum of rigidity to withstand the strains of use, and to present a smooth and finished appearance.

The turned in edges of the lower handle member prevent the lateral displacement of the spring 7.

The forward end 12 of the spring 7 is extended over the rear edge of the cutters and when the device is operated to close the cutters, this forward end of the spring tends to apply a strong yielding pressure on the rear edge of the upper cutter to balance the cutting pressure applied by the upper jaw and thus prevent any cramping of the upper cutter upon the central guide member.

The central portion of the lower cutter 27 is depressed as shown at 43 to form a seat for the spring 36 and the upper end of the spring surrounds the nozzle 29 on the upper cutter.

The modified structure shown in Figs. 11 and 12 is only modified as regards the means for applying the cutting pressure. In this form the upper jaw member 23 is replaced by a lever 44, the rear portion of which is engaged by the upper handle member as in the form described, but the forward end is formed into two segmental toothed gears 45 central to the pivot 22, and the upper cutter 28 carries a box-like central housing 46 formed on its inner wall with vertically disposed co-operating toothed racks 47. It will readily be understood that when the handle 2 is pressed down or toward the other, the upper cutter will be forced toward the opposite cutter through the medium of the segmental gears and racks. In this modified form, the main spring 7 acts in the same manner as before to apply a cutter closing pressure back of the pivot pin 22, as before.

As many modifications of the invention will readily occur to those skilled in the art, I do not limit or confine the invention to the specific details of construction herein shown and described.

I claim:

1. In a device of the kind described, a lever formed up out of sheet metal and provided with a handle at one end and a cutter support at the other end, a second handle pivoted to the first handle between the support and the handle part, a disc cutter on the support, the support formed with an upstanding rim, having a flat edge for contact with the disc cutter near its periphery as and for the purpose specified.

2. In a device of the kind described a channel shaped combined handle and cutter support member, the flange of the member being continuous around the cutter end and forming a circumferential support for a disc-like cutter.

3. In a device of the kind described a pair of disc-like cutters, means for moving one cutter from and toward the other, a cup-like support for one of the cutters having a circumferential up-standing edge for contact with the cutter, as and for the purpose specified.

4. In a device of the kind described, a pair of disc-like cutters, a rigid guide post upon which the cutters are mounted, and interengaging guide parts on the cutters for retaining them in circumferential register.

5. In a device of the kind described, a pair of disc-like cutters, a cup-like support for one of the cutters, a guide post rising from the center of the cup, a screw projecting through the bottom of the cup, and rigidly clamping the post in position, the bottom of the cup dished inwardly to shorten the post and to sink in the head of the screw.

6. In a device of the kind described, a pair of hand levers, a pair of opposed cutters, the hand levers pivoted together between their ends, the cutters supported on one of the levers, a cap-like lever pivotally mounted above the cutters, the opposite hand lever formed and adapted for operative engagement with the cap-like lever to force the cutters together when the handles are forced toward each other.

In witness that I claim the foregoing as my invention, I affix my signature this 2nd day of July, 1931.

WILLIAM A. PETERS.